W. A. BOX.
ROLL FOR CRUSHING MACHINES.
APPLICATION FILED APR. 20, 1908.

1,036,067.

Patented Aug. 20, 1912.

Witnesses

Inventor
William A. Box
by
Attorney

COLUMBIA PLANOGRAPH CO., WASHINGTON, D. C.

UNITED STATES PATENT OFFICE.

WILLIAM A. BOX, OF DENVER, COLORADO.

ROLL FOR CRUSHING-MACHINES.

1,036,067.

Specification of Letters Patent. Patented Aug. 20, 1912.

Application filed April 20, 1908. Serial No. 428,092.

*To all whom it may concern:*

Be it known that I, WILLIAM A. Box, a citizen of the United States of America, residing at Denver, in the county of Denver and State of Colorado, have invented certain new and useful Improvements in Rolls for Crushing-Machines, of which the following is a specification.

This invention relates to new and useful improvements in rolls for crushing machines.

The object of the invention, is to provide a crushing roll in which simplicity of construction is combined with great durability and thorough practicability in use, which, being rigidly connected with the shaft at a plurality of points remote from its longitudinal axis, will constantly move in unison therewith, and in which the pressure, exerted by the shaft while imparting its rotative movement thereto, is evenly distributed so as to effectively counteract the opposing force exerted upon its peripheral parts by frictional contact with the material under treatment.

A further object of my invention is to provide a crushing roll, the several parts of which may be assembled or separated in a minimum of time to replace disabled or worn members, and in which the strain, produced by the transmission of energy from the shaft to the roll, acts principally upon non-expensive and easily renewed parts.

Figure 1:
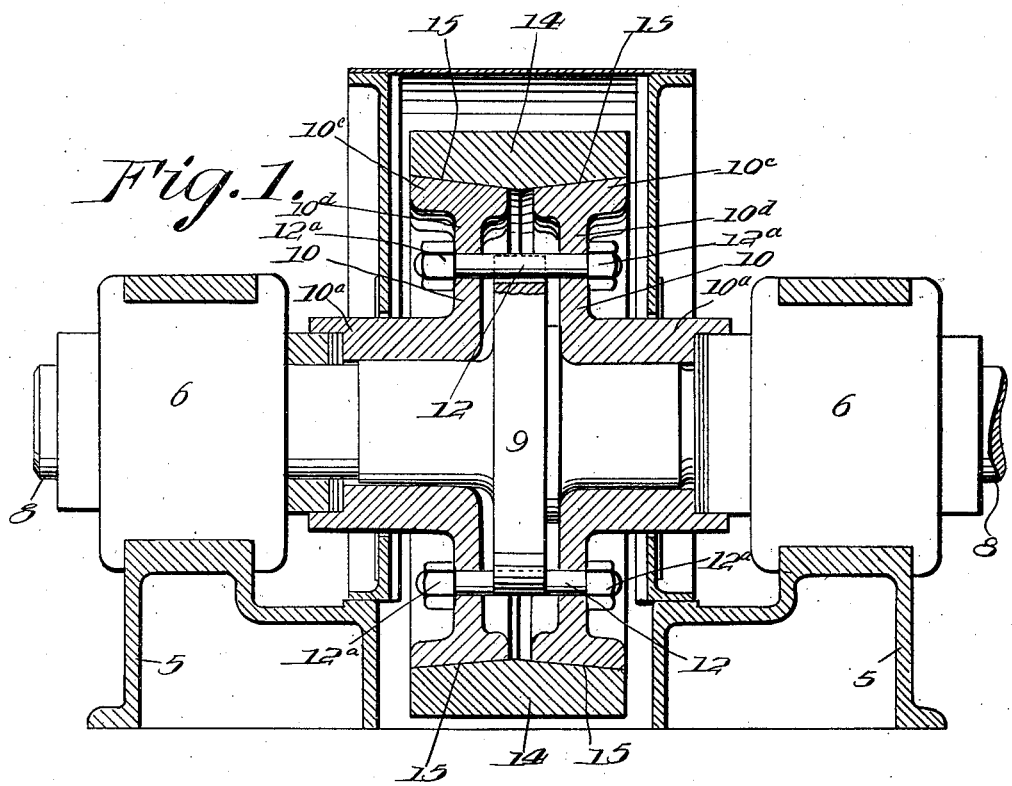
Figure 2:
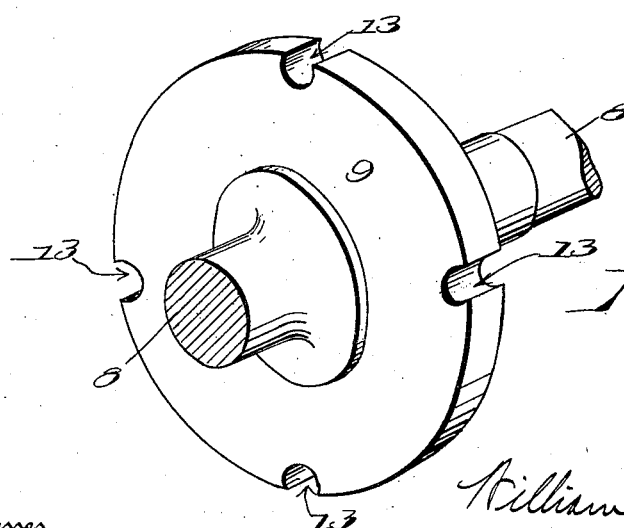

I attain these objects by the mechanism illustrated in the accompanying drawings in the various views of which like parts are similarly designated and in which, Figure 1 is a longitudinal sectional view, and Fig. 2 is a detail perspective view of the collar.

Referring to the drawings, the reference character 5 designates the stationary bed frame of the machine provided with bearing boxes 6, which support the roll carrying shaft 8.

The shaft 8 is provided with a concentric, integral collar 9 which, in practice, constitutes the driving element through the instrumentality of which rotary motion of the shaft is transmitted to the surrounding roll. The roll is composed of two identical members 10, each of which includes a hub $10^a$, adapted to engage the circumferential surface of the shaft, and a surrounding concentric rim $10^c$, united by an interposed integral web $10^d$.

The two members 10, when assembled upon the shaft, are positioned at opposite sides of the collar 9, their webs $10^d$, which connect with the respective hubs $10^a$ at one of the extremities of the latter, extending in close proximity thereto.

The members 10, are connected by means of a plurality of bolts 12 which project through registering, correspondingly formed apertures in the webs $10^d$ and which are placed in seats formed by equidistant peripheral indentations 13 in the interposed driving element 9. The bolts 12 are, each, provided with nuts $12^a$, which, being screwed upon their protruding, threaded ends, engage the outer faces of the two webs and are instrumental in securing a tire or shell 14 upon the two members 10, as will now be described.

The shell 14, which, being composed of hardened metal, provides the crushing surface of the roll of which it forms part, is composed of a ring, the circumferential face of which is flat, while its internal surface is divided into two outwardly flaring conical faces 15, which meet in a central, common vertex.

The circumferential faces of the two members 10, which, when the parts are assembled, respectively engage the faces 15 of the annular element 14, are made conical to coincide therewith so that, when, by manipulation of the nuts $12^a$ upon the bolts 12, the two members 10 are drawn together, they will wedge into the shell 14 and rigidly secure the latter against rotation or lateral movement.

The outer extremities of the hubs $10^a$ are recessed for the reception of the adjacent ends of the bearing boxes in which the shafts 8 are supported.

In the operation of my improved machine, rotary movement is imparted to the shaft 8 by any suitable means, which movement of the shaft is transmitted to the members 10 through the instrumentality of the bolts 12, which, as described, are seated in the peripheral recesses 13 of the collar 9.

It will be observed that, inasmuch as the motive force is transmitted from the shaft to the roll at a considerable distance from the longitudinal axis of the former, the stress upon the bolts, through instrumentality of which the said transmission is effected, is considerably reduced while the resultant strain upon the members of the roll is evenly distributed throughout their extent, and, as the said bolts are inexpensive and readily accessible, incapacitation of the roll, due to excessive strain or defective parts, may be remedied at a slight cost and in the minimum of time.

Having thus described my invention what I claim is:—

In combination, with a shaft, a collar integral with the shaft and located intermediate the ends thereof and formed on its periphery with a series of transverse bolt seats, a member mounted on the shaft on each side of said collar, said members being composed of elongated hubs, a web and a rim having a conical periphery, a shell having interior divergent faces which conformably engage said conical peripheries of said members, bolts seating in said bolt seats and having their ends extending through openings provided therefor in said webs of said members, and nuts on the bolts to draw said members toward each other to clamp the shell thereto, whereby said shell is connected to the shaft at a plurality of points remote from the longitudinal axis of the shaft.

In testimony whereof I have affixed my signature in presence of two witnesses.

WILLIAM A. BOX.

Witnesses:
G. J. ROLLANDET,
K. M. STUMP.

Copies of this patent may be obtained for five cents each, by addressing the "Commissioner of Patents, Washington, D. C."